United States Patent

[11] 3,603,781

[72] Inventors: Tatsuo Kobayashi, Handa Kaizuka-shi, Osaka-fu; Yoshifusa Fujii, Mori Kaizuka-shi, Osaka-fu; Hiroshi Ueda, Nara-shi, all of, Japan
[21] Appl. No.: 816,263
[22] Filed: Apr. 15, 1969
[45] Patented: Sept. 7, 1971
[73] Assignee: Minolta Camera Kabushiki Kaisha, Osaka, Japan
[32] Priority: Apr. 16, 1968, Apr. 22, 1968
[33] Japan
[31] 43/25356 and 43/26615

[54] FOLDABLE STROBO DISCHARGE FLASH SYSTEM
7 Claims, 15 Drawing Figs.

[52] U.S. Cl. ................... 240/1.3, 240/36, 240/103
[51] Int. Cl. .................. G03b 15/02
[50] Field of Search ........... 240/1.3, 36, 41.36, 44.1, 103; 95/11

[56] References Cited
UNITED STATES PATENTS

| 2,205,860 | 6/1940 | Olds | 240/1.3 |
| 2,694,138 | 11/1954 | Schwinn | 240/36 X |
| 2,913,569 | 11/1959 | Edelstein | 240/1.3 |
| 3,204,089 | 8/1965 | Schmidt | 240/1.3 |
| 3,207,890 | 9/1965 | Fischer | 240/1.3 |
| 3,273,479 | 9/1966 | Jakob | 240/1.3 X |

Primary Examiner—Samuel S. Matthews
Assistant Examiner—Fred L. Braun
Attorney—Watson, Cole, Grindle & Watson ABSTRACT: A foldable strobo discharge flash system comprising a cylindrical strobo discharge tube and a reflecting mirror forming a cylindrical curved surface which has the discharge tube at its focal line and is made of flexible and elastic metal plate so as to be folded compactly. One of the edges of the flexible reflecting plate is set on a movable frame member supporting the strobo discharge tube and the curvature of the reflecting plate is varied in coordinating with the operation of the movable frame member. At a full open state of the movable frame member the reflecting plate becomes a reflecting mirror for the strobo discharge tube and at a closed state the reflecting plate is folded flat. Further, the power switch of the strobo discharge tube is turned on or off in coordinating with the operation of the movable frame member.

FOLDABLE STROBO DISCHARGE FLASH SYSTEM

BACKGROUND OF THE INVENTION

In usual strobo discharge flash systems the reflecting mirror occupies a large fraction of the whole bulk of the system. This has been the reason why strobo discharge flash systems tend to to be of large size. When using a strobo discharge flash system, the power switch is often inadvertently left in an on or off position. As a consequence, the discharge tube fails to flash if the power switch is open, resulting in a waste of film and if the power switch is left closed when the discharge tube is not used, there is a waste of electricity due to leakage current through the condenser.

SUMMARY OF THE INVENTION

A first feature of the present invention is a strobo discharge flash system in which the reflecting plate is spread open into a position ready to use by operating the movable frame member supporting the strobo discharge tube, and on the other hand, the reflecting plate can be folded to reduce the size of the whole system so that the system is easy to carry and attach to a camera.

A second feature of the present invention is the use of elastic reflecting plates on both sides of the flash system which are folded and unfolded in cooperation with the position of the reflecting plate and then enclosing the discharge tube in both the open and closed positions within these elastic reflecting plates and the transparent member are mounted on both side plates of the frame member by an axle.

Furthermore, a third feature of the present invention enables the power switch to be turned on or off in a coordinated motion with the movable frame member in order to avoid waste of electricity and film by misoperation of the switch.

OBJECTS OF THE INVENTION

A first object of the invention is to provide a collapsible strobo discharge system that is easily transportable.

A second object of the invention is to eliminate the danger of electrical shock caused by contact with the flash or discharge tube of the flash unit.

A third object of the invention is to provide a strobo flash system having means for coordinating the setting of the power switch with the movable frame to prevent waste of electricity and film.

BRIEF DESCRIPTION OF THE DRAWINGS

FIGS. 2A and 2B showing open and closed positions; of the reflecting plate, respectively, in which one of the edges of the elastic reflecting plate is shifted up and down while the other edge is fixed;

FIGS. 3A and 3B illustrate open and closed positions of the reflecting plate, respectively, in which one of the edges of the elastic reflecting plate is shifted up and down while the other edge is translated back and forth; (A) is the perspective showing the open state and (B) shows the closed state, respectively. FIG. 4 is a rough drawing of the movable frame member in the case as shown in FIG. 2; (A) is a side view of the movable frame member as it is rotated about an axis.

FIG. 4 (A).

DESCRIPTION OF THE PREFERRED EMBODIMENT

Figure 1:
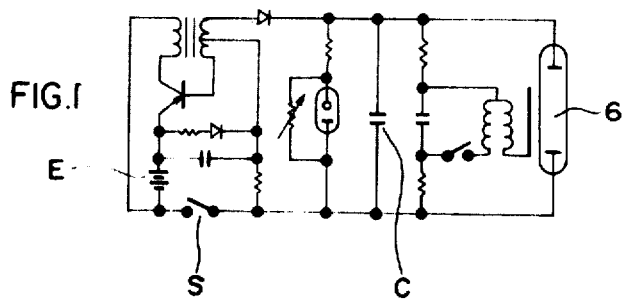
FIG. 1 shows a wiring diagram of the lighting network of the strobo discharge flash.

FIG. 1 is the illustration of a well-known flash circuit for a strobo discharge tube in which E is the power source, S is the power switch, C is a condenser and 6 is the strobo discharge tube. As shown in FIGS. 2A, 2B, 3A and 3B the strobo discharge tube which is operated by the above mentioned network is a cylindrical light source, and hence the reflecting mirror forms a cylindrical curved surface which has the tube at its focal line.

Figure 2A:
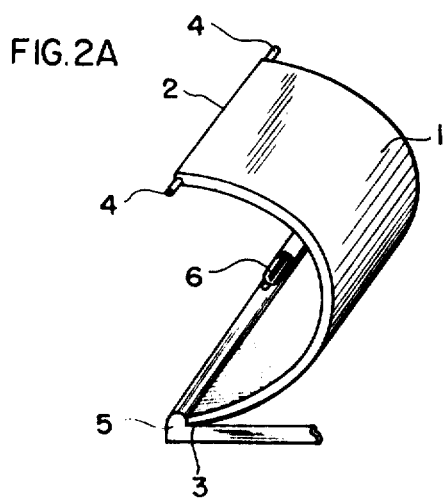
FIGS. 2A, 2B, 3A and 3B are perspective views illustrating the flexible and elastic reflecting plate relative to the strobo discharge tube in both open and closed positions.
Figure 2B:
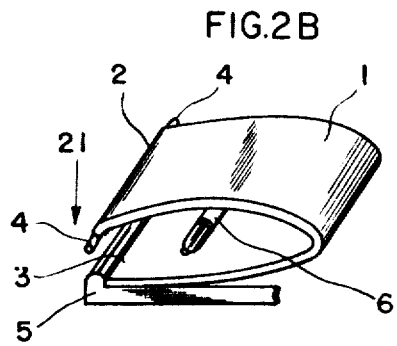
Figure 3A:
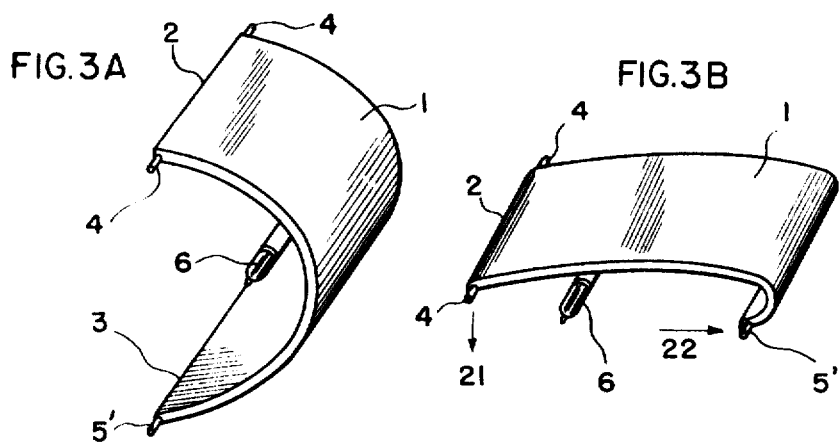
Figure 3B:
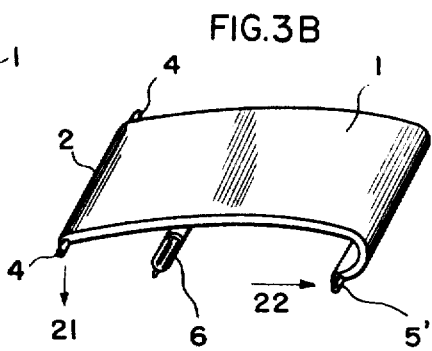

When a flexible and elastic reflecting plate 1 is bent as shown in FIG. 2A by mounting one of the edges of the plate 2 on the movable frame member not shown around axle 4 and the other edge 3 is attached to a fixed member 5, the reflecting plate 1 forms a curved surface which is approximately cylindrically parabolic, and serves as a reflecting mirror for a strobo discharge flash unit with a strobo discharge tube 6 positioned in the neighborhood of the focal line of the curved surface. When the axle 4 is displaced with the movable frame member in the direction of the arrow 21 as shown in FIG. 2B the elastic reflecting plate 1 changes into a closed position and the unit becomes compact since the reflecting mirror is flattened. Similarly, in FIGS. 3A and 3B one of the edges 2 of the elastic reflecting plate 1 is mounted on the movable frame member with the axle 4, and the other edge 3 is set on a sliding member with the axle 5'. FIG. 3A shows an open position of the elastic reflecting plate and a strobo discharge tube is disposed in the neighborhood of the focal line of its curved surface. When the axle 4 is displaced in the direction of the arrow 21 by operating the movable frame member and the axle 5' in the direction of the arrow 22 by the sliding member, the system changes into a closed position as shown in FIG. 3B and the reflecting mirror becomes flat.

Figures 4A, 4B:
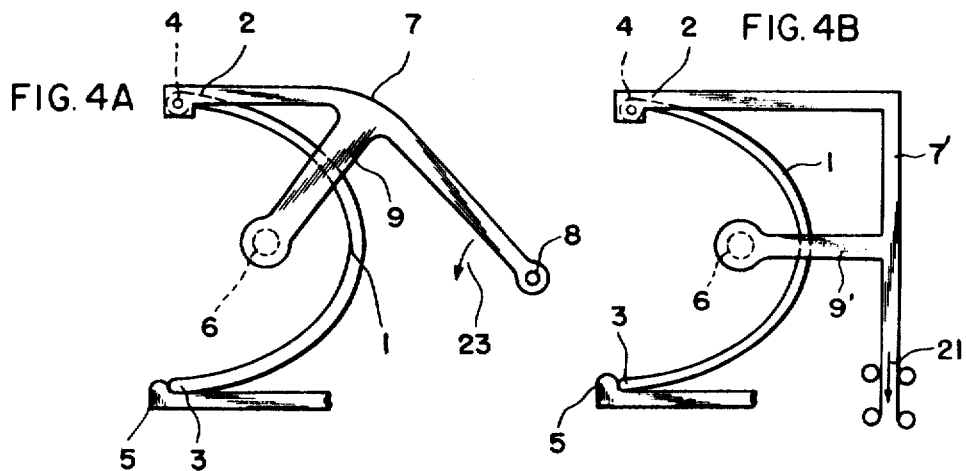
FIG. 4B is a side view of the frame showing translation in a vertical direction.

In both cases mentioned above, the strobo discharge tube 6 must move simultaneously with the axle 4 with the motion of the movable frame member. In FIGS. 4A and 4B the strobo discharge tube 6 is mounted on the movable frame member 7 so that the reflecting plate 1 is opened or closed by operating the movable frame member 7. In FIG. 4A one of the edges of the movable frame member 7 is mounted on a fixed member by the axle 8 and the other edge is hinged with the edge 2 of the elastic reflecting plate 1 around the axle 4 while the other edge 3 of the reflecting plate 1 rests on the fixed member by the axle 5 and an arm 9 supports the strobo discharge tube 6. Therefore, when the movable frame member 7 is rotated in the direction of the arrow 23, the folding operation as shown in FIG. 2A and B takes place. In FIG. 4B the movable frame member 7 is slid in the vertical direction of the arrow 21 instead of the rotation as mentioned above.

Figure 5:
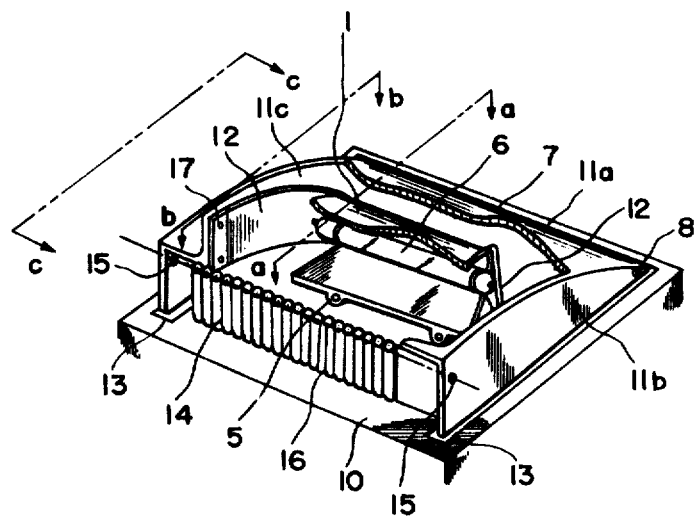
FIG. 5 is a partially cut open oblique view of a first embodiment of the strobo discharge unit in accordance with the structure of FIGS. 2A, 2B.
Figure 6:
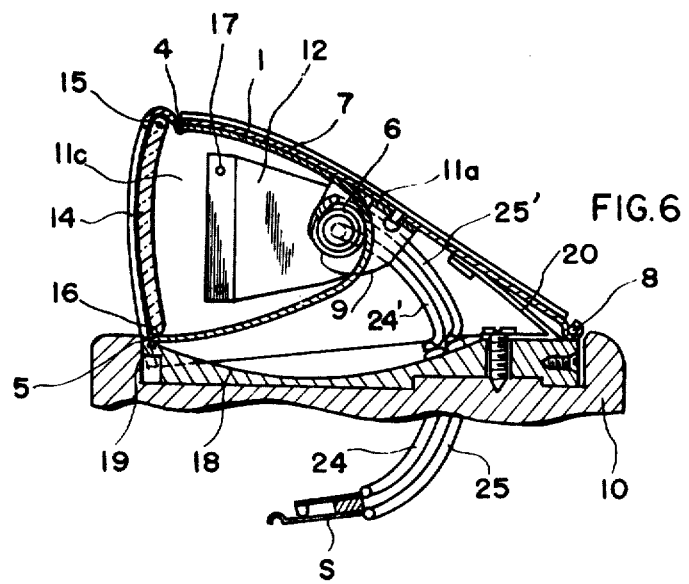
FIG. 6 is a cross-sectional side view when along lines $a-a$ in FIG. 5 of the open strobo discharge structure.
Figure 7:
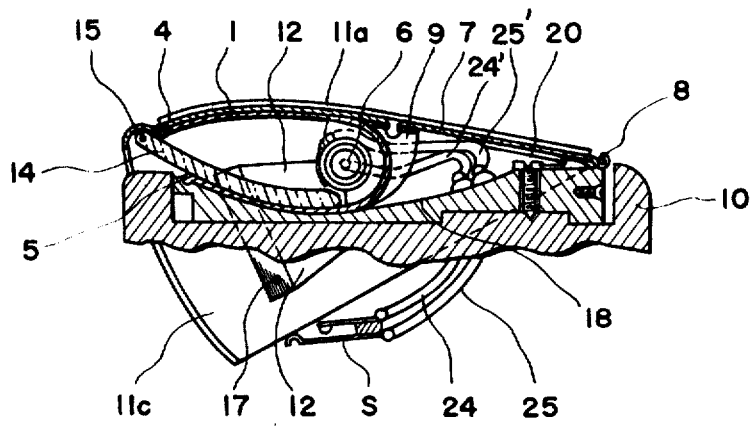
FIG. 7 is a cross-sectional side view as in FIG. 6 but showing the closed position of the strobe discharge structure.
Figure 8:
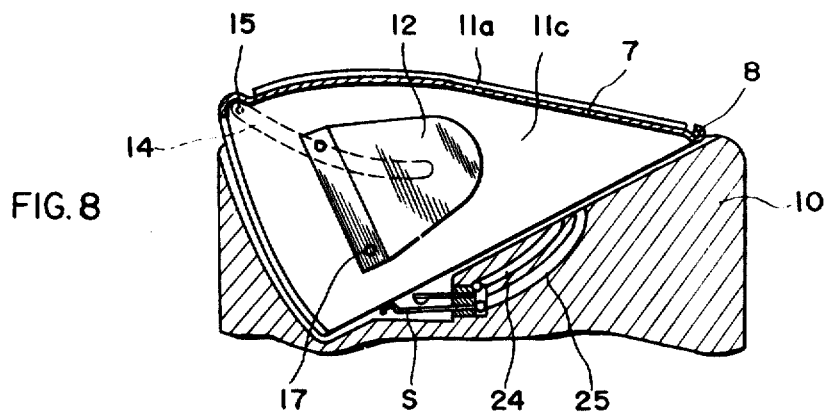
FIG. 8 is a cross-sectional side view taken along line $b-b$ of the embodiment in FIG. 5 showing the closed position of the strobe discharge structure.
Figure 9:
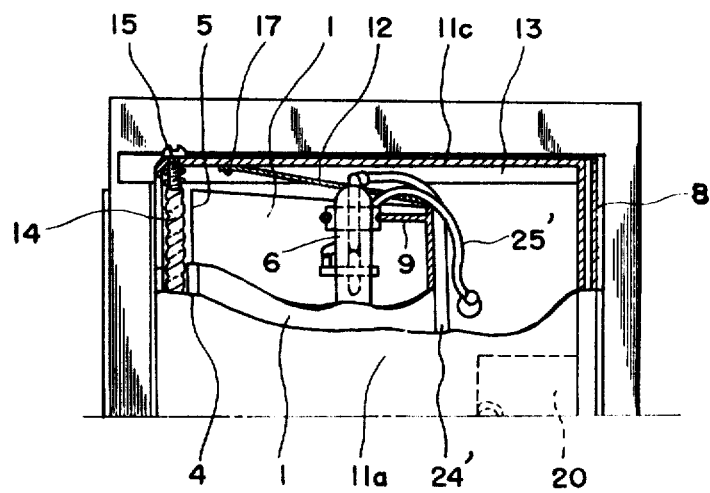
FIG. 9 is a partially open top view of the strobe discharge structure taken along line $c-c$ in FIG. 5.

The first embodiment of the present invention employing the principle illustrated in FIGS. 2A, 2B and FIG. 4A will be explained in detail with reference to FIGS. 5 through 9. The movable frame member 7 of the strobo discharge flash unit comprising a top plate 11a and sideplates 11b and 11c are mounted on a base table 10 by an axle 8 and is biased to close upon the base 10 by a leaf spring 20 shown in FIG. 6. The front edge of the reflecting plate 1 made of flexible elastic metal sheet rests on the front side of the top plate 11a of the frame member 7 and the other edge of the reflecting plate 1, bent over in an arc, is mounted on the front side of the base 10 which is made of hard material and has a concave surface 18. Stainless steel having a thickness of approximately 0.04 mm. is suitable material for the reflecting plate mentioned above, since it has enough flexibility, elasticity and reflexibility. The strobo discharge tube is supported at both ends by the arms 9 which extend out of the top plate 11a of the frame member 7 and in the position when the frame member 7 is open. Consequently the elastic reflecting plate is opened as shown in FIG. 5, FIG. 6 and FIG. 9, and the strobo discharge tube 6 is disposed in the neighborhood of the focal line of a cylindrical parabolic surface formed by the reflecting plate 1. Transparent material of lens shape is disposed on the front side of the frame member 7 and supported at its top side by the axle 15 on the upper front edges of both sideplates 11b and 11c. In the open position of the frame member 7 the bottom side of the transparent material 14 rests on the flat portion 19 in front of the concave surface 18 on the base 10 and as a result the frame member is prevented from closing because of the leaf spring 20. On both sides of the base 10 long slots 13 are made, through which both sideplates 11b and 11c of the frame member slide down in the closed position. The elastic reflecting plates are fixed on both sideplates 11b and 11c by rivets 17. In the open position, plates 12 form reflecting surfaces on both sides of the parabolic reflecting plate 1. The former plates 12 are pressed by their own elasticity upon the edge lines of both sides of the latter plate 1 and thus a reflecting mirror is formed. The flash unit is composed of the elastic reflecting plate 1 forming a cylindrical parabolic surface in the open position of the frame member 7, the strobo discharge tube 6 positioned in the neighborhood of the focal line of the parabolic surface, the elastic reflecting plates 12 pressed upon both side edges of the reflecting plate 1 and the transparent member 14 of lens shape in the front portion.

To close the frame member 7, the transparent member 14 is pressed at its lower edge 16 to slip out of the flat portion 19 of the base 10, and slides along the concave surface 18. At the same time the parabolic elastic reflecting plate begins to close as the frame member closes because of the leaf spring 20. Besides, the elastic reflecting plates 12 on both sides are forced to open against their elasticity by both side edges of the transparent member 14 and are pressed upon both sideplates 11b and 11c of the frame member 7, and then slid into the long slots 13 of the base 10 along with the sideplates 11b and 11c as shown in FIG. 7 and FIG. 8 whereby parabolic elastic reflecting plate 1 is folded compactly.

To open the unit, the frame member 7 is lifted against the elasticity of the leaf spring 20. Along with the opening of the frame member 7 the elastic reflecting plate 1 is spread open, the transparent member 14 is set on the flat portion 19 of the base 10, the elastic reflecting plates on both sides 12 together with the sideplates 11b and 11c slide out of the long slots 13, the elastic plates 12 press the edge lines of both sides of the elastic reflecting plate 1 which spreads open parabolically by its own elasticity, and thus the reflecting mirror of the flash system is ready for operation.

A power switch S is provided between wires 24 and 25 which connect the power source E and the electrodes of the strobo discharge tube 6 supported by the arms 9. The contact point of the switch is regulated by the movable frame member 7 or a member which is displaced by the motion of the frame member such as the sideplate 11b or 11c of the frame member 7. The switch S is closed when the frame member is in the open position and on the contrary the switch is open when the frame member is in the closed position.

Figure 10:
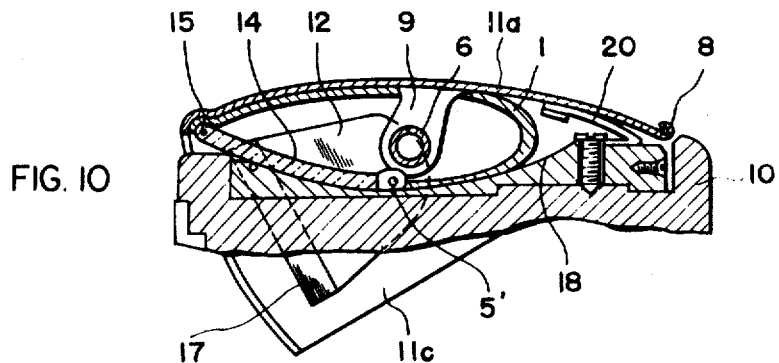
FIG. 10 is a side view of a second embodiment showing the strobe discharge structure in the closed position illustrated in FIG. 3.

In the second embodiment illustrated in FIG. 10, the bottom side of the parabolic elastic reflecting plate 1 rests upon the lower edge 16 of the transparent member 14 by the axle 5', while in the first embodiment mentioned above the bottom side of the elastic reflecting plate 1 is fixed to the base 10. Therefore, when the frame member is closed the top side of the parabolic reflecting plate 1 comes down and at the same time the bottom side thereof, as well as the lower edge 16 of the transparent member 14, slides rearward along the concave surface on the base 10, and thus the unit is closed. The rest of the mechanism is the same as in the first embodiment.

Figure 11:
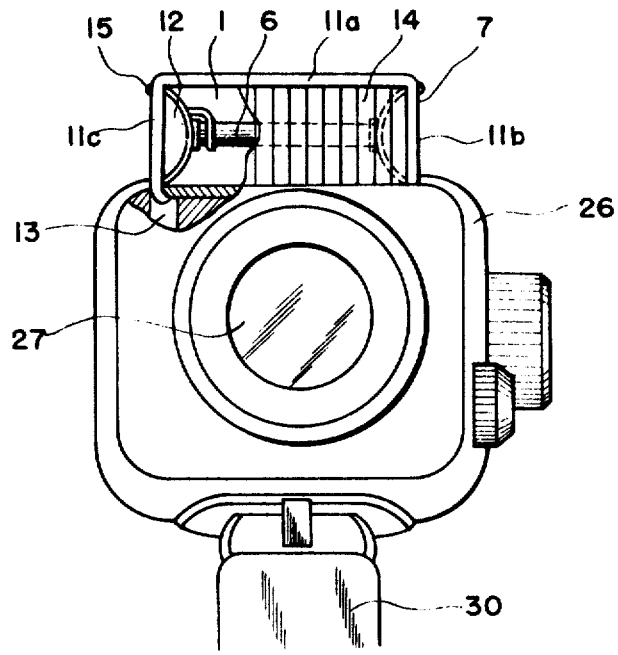
FIG. 11 is a partially open front view of a third embodiment of the present invention mounted to a camera.
Figure 12:
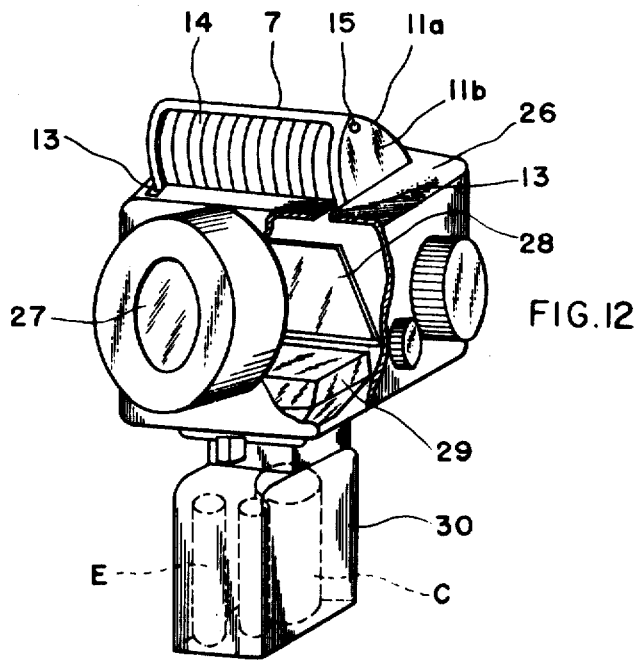
FIG. 12 is a partially open perspective of the same embodiment as in FIG. 11.

In the third embodiment of the present invention shown in FIG. 11 and FIG. 12, the strobo discharge flash unit explained in the first embodiment is mounted in a camera where the upper side face of the camera 26 serves as the base 10 and is provided with a long slot 13 through which both sideplates 11b and 11c of the movable frame member 7 and the side elastic reflecting plates 12 slide. 27 is the lens system, 28 is a movable reflecting mirror and 29 is a pentagonal prism. Since the strobo discharge flash unit is built on the top face of the camera 26 the finder system is provided on the bottom face of the camera. A handgrip 30 protruding at the bottom face of the camera contains the power source E of the lighting network and condenser C.

In the above mentioned embodiments various mechanical designs are available. For example, the movable frame member 7 can be opened or closed by hand instead of the leaf spring 20 where friction is used for setting the open or the closed position. If the snap-action mechanism is employed in place of the leaf spring 20, and if a spring is provided at the axle 15 in FIG. 5 to rotate the transparent member 14 clockwise, the opening or closing motion is performed by a light touch on a pushbutton. If a stopper member is provided in the mechanism, the opening or closing operation is completed automatically by releasing it.

We claim the features of the present invention as follows:

1. An electronic flash unit comprising:
   a base member having an opening therein,
   a movable frame cover hinged at one end to said base member to rotate from an open position in which the other end of said frame cover extends above said base member and to a closed position in which said frame cover is in closely spaced relationship to said base member,
   a flexible and elastic light reflecting member having one end mounted to the nonhinged end of said movable frame cover and the other end supported by said base member,
   support means fixed to said frame cover for retaining a flash tube,
   said light reflecting member forming a parabolically shaped sheet with said frame cover in said open position and said flash tube positioned proximate to the focal line of said paraboloid,
   and said light reflecting member collapses with said frame cover in said closed position.

2. An electronic flash unit as in claim 1 further comprising a spring mounted between said movable frame cover and said base to retain said frame cover in said open position.

3. An electronic flash unit as in claim 1 further comprising a transparent member hinged at the free end of said frame cover and extending across both ends of said light reflecting member with said frame cover in said open position, the free end of said transparent member resting on said base member with said frame cover in said open position and sliding along said base member to swing within said light reflecting member with said frame cover in said closed position.

4. An electronic flash unit as in claim 3 wherein said end of said light reflecting member supported by said base member is mounted to the end of said transparent member which rests on said base member.

5. An electronic flash unit as in claim 1 wherein said movable frame cover includes sidewalls and said base member includes elongated apertures so that said sidewalls extend through said elongated apertures with said frame cover in said closed position,
   said flash unit further comprising side reflector members, each reflector member is internally mounted at one end thereof to a respective one of said sidewalls, the free ends of said side reflector members are biased to enclose the sides of said parabolically shaped sheet with said frame cover in said open position, the free ends of said side reflector members extending into and through said elongated apertures with said frame cover in said closed position.

6. An electronic flash unit as in claim 1 further comprising a switch for activating said flash tube and mounted to said base member and wherein said frame cover has a bottom surface engaging said switch with said frame cover in said closed position to open said switch, and said switch is closed with said frame cover in said open position.

7. An electronic flash unit as in claim 1 wherein said end of said light reflecting member supported by said base member is fixed thereto.